W. G. MESNER.
AIRPLANE WIRE FASTENING.
APPLICATION FILED APR. 13, 1918.
1,310,764.
Patented July 22, 1919.
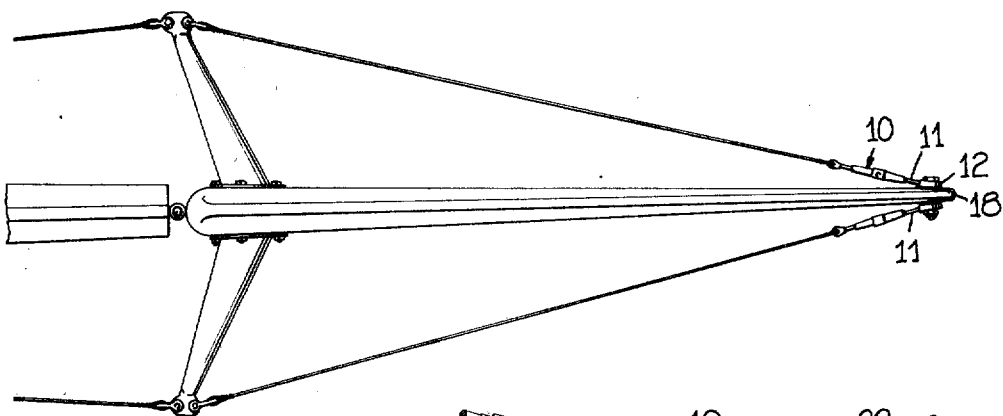
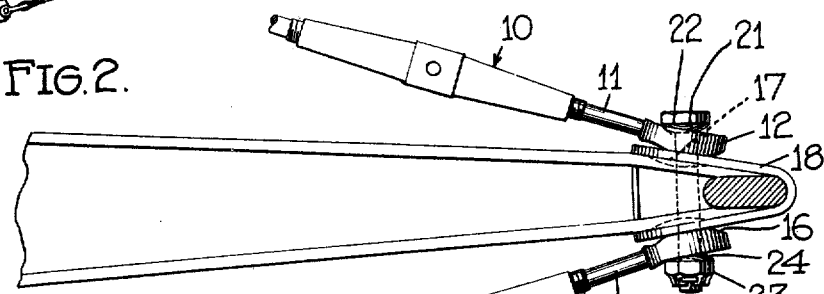
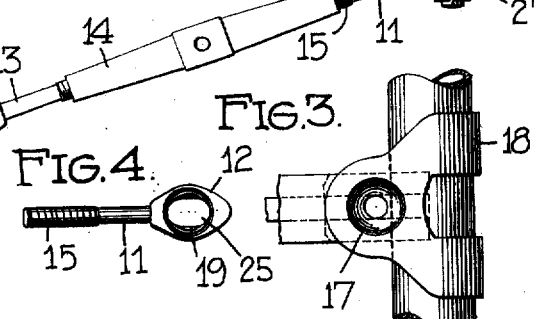
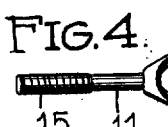
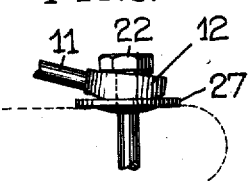
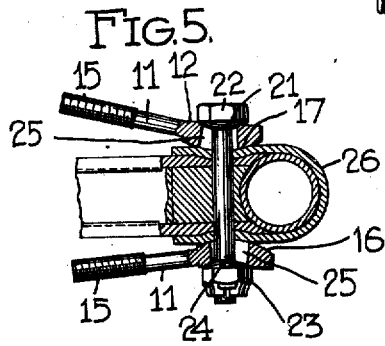
Inventor
WILLIAM G. MESNER
By his Attorney

UNITED STATES PATENT OFFICE.

WILLIAM G. MESNER, OF BUFFALO, NEW YORK, ASSIGNOR TO CURTISS AEROPLANE AND MOTOR CORPORATION, A CORPORATION OF NEW YORK.

AIRPLANE WIRE-FASTENING.

1,310,764. Specification of Letters Patent. Patented July 22, 1919.

Application filed April 13, 1918. Serial No. 228,449.

*To all whom it may concern:*

Be it known that I, WILLIAM G. MESNER, a citizen of the United States, residing at Buffalo, in the county of Erie and State of New York, have invented certain new and useful Improvements in Airplane Wire-Fastenings, of which the following is a specification.

My invention relates to stay wire fastenings for airplanes and is characterized as follows: Either the wire pull itself or one end of the tunrbuckle used for tightening it, is provided with an eye-head instead of a clevis as heretofore. An elongated opening or eye is formed in the eye-head through which a retaining pin or bolt extends. The general shape of the eye-head is spherical or concavo-convex. The convexed or ball-faced surface of the eye-head engages with a substantially complemental concavity or depression formed in a clip or other element constituting a part of the fastening. The opposite or concaved side of the head engages the head of the bolt which is also ball-faced on its under surface to complement the concavity or depression in the eye-head. In other words, the eye-head is held by and between concaved and convexed surfaces respectively whereby a substantially ball and socket joint is provided. Accordingly the angle of pull on the stay wire or turnbuckle may be varied through certain predetermined limits without loosening or detaching the wire or turnbuckle and without providing a separate connection between the wire or turnbuckle and the element to which the pull is applied.

Although unlimited in its use the fastening is especially designed as an airplane fitting. It not only eliminates several heretofore essential parts but by reason of its direct fastening with the aerofoil surface the head resistance or drag is reduced. Another advantage of equal importance is the fact that the angle of pull of the brace wires may be varied within certain predetermined limits (at least 10°) without altering the connection or effecting the adjustment in any way. Moreover, the pull is directly applied to the attaching means for the aerofoil fitting in connection with which the fastening is used. The fitting illustrated however is only preferred for it is obvious that a similarly constructed element might readily be used instead without departing from the spirit of the invention as claimed.

Of the drawings:

Figure 1 is an elevation or edge view of one of the control surfaces of an airplane illustrating the preferred application of the invention.

Fig. 2 is a detail view of the fastening.

Fig. 3 is a plan view of the fitting or clip in connection with which the fastening is used (an element other than the fitting may equally as well be used).

Fig. 4 is a plan view of the turnbuckle shank.

Fig. 5 is a view similar to Fig. 2 illustrating a modified form of clip. The position of the turnbuckle shanks in this view indicates the limit angles through which the stay wire may be moved, and Fig. 6 is still another view similar to Fig. 2 illustrating a further modification.

In the selected embodiment of the invention the turnbuckle, designated as an entirety by the numeral 10, is of substantially the ordinary construction except that one of its shanks 11 is provided with a substantially spherical or concavo-convex eye-head 12 rather than with a clevis as heretofore. The difference in construction between the turnbuckle shanks can be seen in Fig. 2. The shank 13 in this figure is of a well known construction, while the shank 11, at the opposite end of the turnbuckle barrel 14 is constructed in accordance herewith. Both shanks are provided with screw threads 15 that adjustment of the turnbuckle may be effected in the usual manner, *i. e.* through rotation of the barrel 14.

One face of the shank 11 of the turnbuckle is convexed as at 16 to complement a concavity or depression 17 formed in the clip or other element 18 in connection with which the turnbuckle 10 is used. The clip illustrated is of the trailing edge type. It is bent around the trailing edge of the aerofoil or control surface so that its arms or extensions will lie flat against opposite faces thereof. Where connections are desired between both extensions of the clip and an element remote therefrom both extensions are depressed or concaved as indicated at 17. Where but a single connection is provided only one of the extensions or arms of the clip need be depressed.

The opposite face of the eye-head 12 of the shank 11 is concaved rather than convexed. The eye-head may therefore be described as of substantially spherical form. Said concaved surface designated as 19 complements the under or ball-faced side 21 of the retaining bolt-head 22. The convexed or rounded under surface of the bolt head 22 thus contacts the opposite face of the eye-head 12 of the turnbuckle shank from that engaging the clip 18 or other element used in its stead. The eye-head 12 does not contact the flat face of the bolt-head at any point. Between its rounded face and the clip or other element the turnbuckle shank is movable to vary the angle of pull applied to the trailing edge of the surface or aerofoil in connection with which the turnbuckle is used. Where opposed turnbuckles or wire pulls are commonly attached to the trailing edge of the aerofoil or surface as in Fig. 2 the inner or engaging face of the nut 23 used for fastening the bolt in place is provided with a ball-face 24 identical with that of the bolt head 22. By tightening the nut and firmly clamping the eye-head 12 between the bolt head and one of the extensions of the clip on the one hand and the nut and the opposite extension of the clip on the other hand an extremely simple and positive stay wire fastening is provided.

Angular adjustment of the pull is made possible by elongating the eye 25 formed in the eye-head 12 of the turnbuckle 10. By giving the eye sufficient elongation, adjustment may be effected until the shank itself comes in contact with the upper surface of the clip. The length of the slot however should determine the limit of adjustment and consequently prevent such contact from taking place. It is sufficient to state that so long as the engaging faces between which the eye-head is clamped are complemental, adjustment may be freely made. The curved spherical surfaces of the bolt clip and wire pull should preferably have a common point for their centers as this will eliminate any and all tendency to bind.

In the modification illustrated in Fig. 5 the clip 26 shown is universal and may be used at any point on any surface of an airplane with any standard turnbuckle having a shank of the character described. Where the arms or extensions of the clip extend parallel the centers of the various curved surfaces line up but where the arms or extensions make an angle with each other (as in Fig. 2) then the centers of the curved surfaces are slightly off. In referring to these centers I have reference to the centers of the surfaces themselves rather than the common center from which the surfaces are described. In Fig. 6 a washer 27 is provided instead of the clip 26 of Fig. 5 and the clip 18 of Fig. 2. In other respects the fastening of Fig. 6 is exactly the same.

While I have described my invention in detail in its present preferred embodiment, it will be obvious to those skilled in the art after understanding my invention, that various changes and modifications may be made therein, without departing from the spirit or scope thereof, I aim in the appended claims to cover all such modifications and changes.

What is claimed is:

1. A fastening for airplane wire pulls including a bolt, a relatively flat eye-head provided at one end of the wire pull through which the bolt passes, and rounded bearing surfaces formed respectively upon the bolt and eye-head, the bearing surfaces being in engagement one with the other whereby the angle of the wire pull may be varied without adjusting the bolt.

2. A fastening for airplane wire pulls including a bolt, a flattened eye-head provided at one end of the wire pull through which the bolt passes, rounded bearing surfaces formed upon the flattened faces of the eye-head, and opposed bearing surfaces formed respectively upon the bolt and the element against which the eye-head is held, the opposed bearing surfaces being in engagement respectively with the rounded bearing surfaces of the eye-head whereby the angle of the wire pull may be varied without adjusting the bolt.

3. A fastening for airplane wire pulls including a bolt, a relatively flat eye-head provided at one end of the wire pull, said head having an enlongated eye formed in it through which the bolt passes, and substantially complemental rounded bearing surfaces formed respectively upon the bolt and eye-head, the arrangement of the surfaces being such that the angle of the wire pull may be varied within predetermined limits without adjusting the bolt.

4. In a fastening for airplane wire pulls, the combination with a turnbuckle, of a bolt, a relatively flat eye-head provided upon one of the turnbuckle shanks through which the bolt passes and rounded bearing surfaces formed respectively upon the bolt and eye-head, the bearing surfaces being in engagement one with the other whereby the angle of the wire pull may be varied without adjusting the bolt.

5. In a fastening for airplane wire pulls, the combination with an airplane fitting provided with a bearing surface, of a bolt, an eye-head provided at one end of the wire pull through which the bolt passes, and bearing surfaces formed respectively upon the bolt and eye-head collectively constituting a substantially ball and socket fitting whereby the angle of the wire pull may be varied without adjusting the bolt.

6. In a fastening for airplane wire pulls, the combination with a fitting having a bearing surface and an opening, of an eye-head provided at one end of the wire pull, a bolt arranged to commonly penetrate the eye-head and the fitting, and bearing surfaces formed respectively upon the bolt and eye-head, said surfaces constituting with the bearing surface of the fitting a substantially ball and socket connection whereby the angle of the wire pull may be varied without adjusting the bolt.

7. A fastening for airplane wire pulls including an eye-head, a rounded bearing surface formed upon the eye-head, a fitting against which the eye-head is held, that face of the fitting bearing on the eye-head being provided with a similar bearing surface, and a bolt for holding the eye-head against the fitting.

8. A fitting for airplane wire pulls including a fitting having a rounded bearing surface, an eye-head having opposed rounded bearing surfaces, one of which bearing surfaces is in engagement with the rounded bearing surface of the fitting, a bolt extended through the eye-head, and means on the bolt for clamping the eye-head against the fitting, said means in turn being provided with a rounded bearing surface which bears against the opposite bearing surface of the eye-head from that engaged by the fitting.

In testimony whereof I hereunto affix my signature.

WILLIAM G. MESNER.